(12) United States Patent
Ayazi et al.

(10) Patent No.: US 7,043,985 B2
(45) Date of Patent: May 16, 2006

(54) HIGH-RESOLUTION IN-PLANE TUNING FORK GYROSCOPE AND METHODS OF FABRICATION

(75) Inventors: Farrokh Ayazi, Atlanta, GA (US); Mohammad Faisal Zaman, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 11/034,145

(22) Filed: Jan. 12, 2005

(65) Prior Publication Data

US 2005/0150297 A1 Jul. 14, 2005

Related U.S. Application Data

(60) Provisional application No. 60/536,333, filed on Jan. 13, 2004.

(51) Int. Cl.
*G01P 9/04* (2006.01)
(52) U.S. Cl. ................. 73/504.04; 73/504.12; 73/504.14; 29/592.1
(58) Field of Classification Search ............. 73/504.04, 73/504.02, 504.12, 504.13, 504.15, 504.16, 73/514.32; 29/592, 592.1
See application file for complete search history.

(56) References Cited

U.S. PATENT DOCUMENTS

| | | | |
|---|---|---|---|
| 5,349,855 A | 9/1994 | Bernstein et al. | |
| 5,488,863 A | 2/1996 | Mochida et al. | |
| 5,728,936 A | 3/1998 | Lutz | |
| 5,780,739 A | 7/1998 | Kang et al. | |
| 5,780,740 A | 7/1998 | Lee et al. | |
| 5,911,156 A | 6/1999 | Ward et al. | |
| 5,920,012 A | 7/1999 | Pinson | |
| 5,945,599 A | 8/1999 | Fujiyoshi et al. | |
| 5,992,233 A | 11/1999 | Clark | |
| 6,067,858 A * | 5/2000 | Clark et al. ............. | 73/504.16 |
| 6,230,563 B1 | 5/2001 | Clark et al. | |
| 6,257,059 B1 | 7/2001 | Weinberg et al. | |

(Continued)

OTHER PUBLICATIONS

Ayazi, F., in "A High Aspect-Ratio High-Performance Polysilicon Vibrating Ring Gyroscope," *Ph.D. Dissertation*, University of Michigan, Ann Arbor (2001).

(Continued)

*Primary Examiner*—Helen Kwok
(74) *Attorney, Agent, or Firm*—Kenneth W. Float (57) ABSTRACT

A microstructure comprising an in-plane solid-mass electrically conductive tuning fork gyroscope and fabrication methods. The gyroscope is formed using substrate material having lower and upper layers sandwiching a sacrificial insulating layer. An exemplary gyroscope comprises a low-resistivity single-crystal silicon substrate having a lower support layer and an upper flexible support layer. Two opposed proof masses that are separated from the lower support layer lie in and are supported by the upper flexible support layer. Two drive electrodes are disposed adjacent to the proof masses and are insulatably supported by the lower support layer and are separated from the upper flexible support layer. Sense, balance and tuning electrodes are disposed adjacent to the proof masses and are insulatably supported by the lower support layer and are separated from the upper flexible support layer. The operational mode shapes are in-plane with the substrate surface and only measures angular motion that are orthogonal to the plane of the substrate. The microstructure flexural design enables the sense and the drive resonant frequencies to occur in close proximity of one another. This enables matched-mode operation of the device thereby ensuring maximum sensitivity.

12 Claims, 8 Drawing Sheets

U.S. PATENT DOCUMENTS 6,481,285 B1 * 11/2002 Shkel et al. .............. 73/504.13
6,742,389 B1 * 6/2004 Nguyen et al. .......... 73/504.12

OTHER PUBLICATIONS

Ayazi, F. and Najafi, K., in "A HARPSS Polysilicon Vibrating Ring Gyroscope" *IEEE/ASME JMEMS*, Jun. 2001, pp. 169-179.

Bernstein, J., et al., in "A Micromachined Comb-Drive Tuning Fork rate gyroscope," *Proceedings MEMS 1993*, pp. 143-148.

Schwarzelbach, O., et al., in "New Approach for Resonant Frequency Matching of Tuning Fork Gyroscopes by Using a Non-Linear Drive Concept," *Proceedings Transducers 2001*, pp. 464-467.

Z. Hao, et al., in "An Analytical Model for Support Loss in Micromachined Beam Resonators with In-plane Flexural Vibrations," *Sensors and Actuators A*, vol. 109, Dec. 2003, pp. 156-164.

Najafi, K., in "Micropackaging Technologies for Integrated Microsystems: Applications to MEMS and MOEMS," *Proc. SPIE Micromachining & Microfabrication Symp. 2003*, pp. 1-19.

Clark. W. A., "Micromachined Vibratory Rate Gyroscopes," *Ph.D. Dissertation*, University of California, Berkeley (1997).

* cited by examiner

HIGH-RESOLUTION IN-PLANE TUNING FORK GYROSCOPE AND METHODS OF FABRICATION

This application claims the benefit of U.S. Provisional Application No. 60/536,333, filed Jan. 13, 2004.

GOVERNMENT RIGHTS

The present invention was funded by the National Science Foundation under contract No. ECS-0301900. The U.S. Government has certain rights in this invention.

BACKGROUND

The present invention relates generally to semiconductor microstructures, such as Micro-Electro-Mechanical Systems (MEMS) devices, along with fabrication and operational methods, and more particularly, to a high resolution in-plane fork gyroscope, and methods of manufacture and operation, which is preferably formed using a silicon-on-insulator (SOI) substrate.

Vibratory micromachined gyroscopes rely on Coriolis-induced transfer of energy between two vibration modes to sense rotation. Micromachined gyroscopes are increasingly employed in consumer and automotive applications, primarily due to their small size and low power requirements. However, they are yet to achieve performance levels comparable to their optical and macro-mechanical counterparts in high-precision applications such as space and tactical/inertial navigation systems.

Conventional MEMS vibratory gyroscopes have yet to achieve inertial grade performance. The requirements for inertial grade devices are rate resolutions and bias stabilities better than 0.1°/h. To achieve this, a vibratory gyroscope must attain very high quality factors (>30,000), large sense capacitances (>1 pF), large mass (>100 µg), and large drive amplitude (>5 µm).

The Brownian motion of the structure represents the fundamental noise-limiting component of a vibratory gyroscope. This is generally discussed, for example, by Ayazi, F., in "A High Aspect-Ratio High-Performance Polysilicon Vibrating Ring Gyroscope," Ph.D. Dissertation, University of Michigan, Ann Arbor (2001), and Ayazi, F. and Najafi, K., in "A HARPSS Polysilicon Vibrating Ring Gyroscope" IEEE/ASME JMEMS, June 2001, pp. 169–179. By equating Brownian motion to the displacement caused by the Coriolis force, one can derive the mechanical noise equivalent rotation (MNEΩ) of the microgyroscope. This is expressed as $$MNE\Omega = \frac{1}{2q_{Drive}} \cdot \sqrt{\frac{4k_B T}{\omega_0 M}} \sqrt{BW} \quad (1)$$

Equation 1 indicates that the mechanical noise floor varies inversely with the drive amplitude ($q_{Drive}$), the square root of the resonant drive frequency ($\omega_0$), and square root of the effective mass in the sense direction (M). Matching the resonant frequencies of the sense and the drive mode improves this resolution by a factor of $\sqrt{Q_{Sense}}$.

This calls for innovative designs and advances in fabrication technology. It would be desirable to have an in-plane, solid-mass silicon tuning fork device that incorporates very high Q, a large mass per unit area, and in-plane matched-mode operation within a single framework—unlike previously reported tuning fork gyroscopes. Such conventional gyroscopes are discussed by Bernstein, J., et al., in "A Micromachined Comb-Drive Tuning Fork rate gyroscope," Proceedings MEMS 1993, pp. 143–148, and Schwarzelbach, O., et al., in "New Approach for Resonant Frequency Matching of Tuning Fork Gyroscopes by Using a Non-Linear Drive Concept," Proceedings Transducers 2001, pp. 464–467.

A number of US patents have been issued that generally relate to the present invention. These include U.S. Pat. No. 5,349,855, issued to Bernstein, et al. entitled "Comb drive micromechanical tuning fork gyro", U.S. Pat. No. 5,488,863, issued to Mochida, et al. entitled "Angular velocity sensor making use of tuning fork vibration", U.S. Pat. No. 5,505,084, issued to Greiff, et al. entitled "Micromechanical tuning fork angular rate sensor", U.S. Pat. No. 5,728,936, issued to Lutz entitled "Rotary speed sensor", U.S. Pat. No. 5,780,740, issued to Lee, et al. entitled "Vibratory structure, method for controlling natural frequency thereof, and actuator, sensor, accelerator, gyroscope, and gyroscope natural frequency controlling method using vibratory structure", U.S. Pat. No. 5,780,739, issued to Kang, et al. entitled "Tuning fork type gyroscope", U.S. Pat. No. 5,911,156, issued to Ward, et al. entitled "Split electrode to minimize transients, motor amplitude mismatch errors, and sensitivity to vertical translation in tuning fork gyros and other devices", U.S. Pat. No. 5,920,012, issued to Pinson entitled "Micromechanical inertial sensor", U.S. Pat. No. 5,945,599, issued to Fujiyoshi, et al. entitled "Resonance type angular velocity sensor", U.S. Pat. No. 5,992,233, issued to Clark entitled "Micromachined Z-axis vibratory rate gyroscope", U.S. Pat. No. 6,230,563, issued to Clark, et al. entitled "Dual-mass vibratory rate gyroscope with suppressed translational acceleration response and quadrature-error correction capability", and U.S. Pat. No. 6,257,059, issued to Weinberg, et al. entitled "Micro-fabricated tuning fork gyroscope and associated three-axis inertial measurement system to sense out-of-plane rotation".

SUMMARY OF THE INVENTION

In order to overcome limitations of conventional gyroscopes, the present invention provides for a gyroscope structure that is based upon a conventional tuning fork's response to angular motion and/or rotation. When tines of a conventional tuning fork are vibrated along a plane, a rotation along its normal axis induces a Coriolis force that causes the tines to vibrate orthogonal to the driven plane. In the present invention, proof-masses (which act as individual tines) are driven to a resonance mode along the x-axis of the gyroscope using comb-driven actuation, and rotation along the z-axis is consequently sensed capacitively at electrodes located along the y-axis of the gyroscope. The xy-plane represents the wafer surface upon which the devices are fabricated.

An exemplary embodiment of the gyroscope comprises a single-crystal substrate having a lower support layer and an upper flexible support layer. First and second separated proof masses that are separated from the lower support layer lie in and are supported by the upper flexible support layer. First and second drive electrodes are disposed adjacent to the proof masses that are insulatably supported by the lower support layer and that are separated from the upper flexible support layer. Sense and tuning electrodes are disposed adjacent to the proof masses and are insulatably supported by the lower support layer and are separated from the upper flexible support layer. Balancing electrodes are disposed adjacent to the support flexures and are insulatably supported by the lower support layer and are separated from the upper flexible support layer.

An exemplary method of forming a gyroscope comprises providing a semiconductor substrate comprising lower and upper layers having a sacrificial insulating layer disposed there between. The substrate is patterned and etched to define first and second separated proof masses formed in the upper layer that are suspended above the lower layer, first and second drive electrodes formed in the upper layer and disposed adjacent to the proof masses that are supported by the insulating layer and lower layer and that have portions thereof adjacent to the proof masses that are suspended above the lower layer, sense electrodes formed in the upper layer disposed adjacent to the proof masses that are supported by the insulating layer and lower layer, and tuning electrodes formed in the upper layer disposed adjacent to the proof masses that are supported by the insulating layer and lower layer.

By way of example, the patterning and etching may form the gyroscope by patterning and etching the lower layer in areas of the upper layer that correspond to proof masses and portions of drive electrodes adjacent to the proof masses. The sacrificial insulating layer exposed by patterning and etching the lower layer may be etched to remove the sacrificial insulating layer and expose the upper layer. The upper layer may be patterned and etched to define the first and second suspended separated proof masses, the first and second drive electrodes having suspended portions adjacent to the proof masses, the sense electrodes, and the tuning electrodes.

The resonant frequencies of the in-plane operational modes of the gyroscope are designed to occur in close vicinity of one another. This enables for matched mode operation, in which case both the modes are excited at resonance in the event of a rotation signal input.

Embodiments of the in-plane solid-mass single-crystal silicon tuning fork gyroscope have the potential to achieve inertial-grade performance and attain sub-deg/hr rate resolution. A reduced-to-practice embodiment of the gyroscope achieves high Q in drive and sense resonant modes ($Q_{drive}$=81,000 and $Q_{sense}$=64,000) with effective mode decoupling. The reduced-to-practice gyroscope was fabricated on 40 μm silicon-on-insulator (SOI) using a two-mask process. The drive and sense resonant modes were matched (balanced) electronically to within 0.01% of each other and the measured rate results show a sensitivity of 7.2 mV/°/s in a bandwidth of 2 Hz.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which:

FIG. 2b illustrates comb and sense gaps of the exemplary tuning fork gyroscope shown in FIG. 2a;

FIG. 2c illustrates support posts for anchors as seen from the back side of the gyroscope shown in FIG. 2a;

FIGS. 4a and 4b show measured drive and sense resonant mode response, respectively, for the prototype tuning fork gyroscope shown in FIG. 2a;

DETAILED DESCRIPTION

Figure 1A:
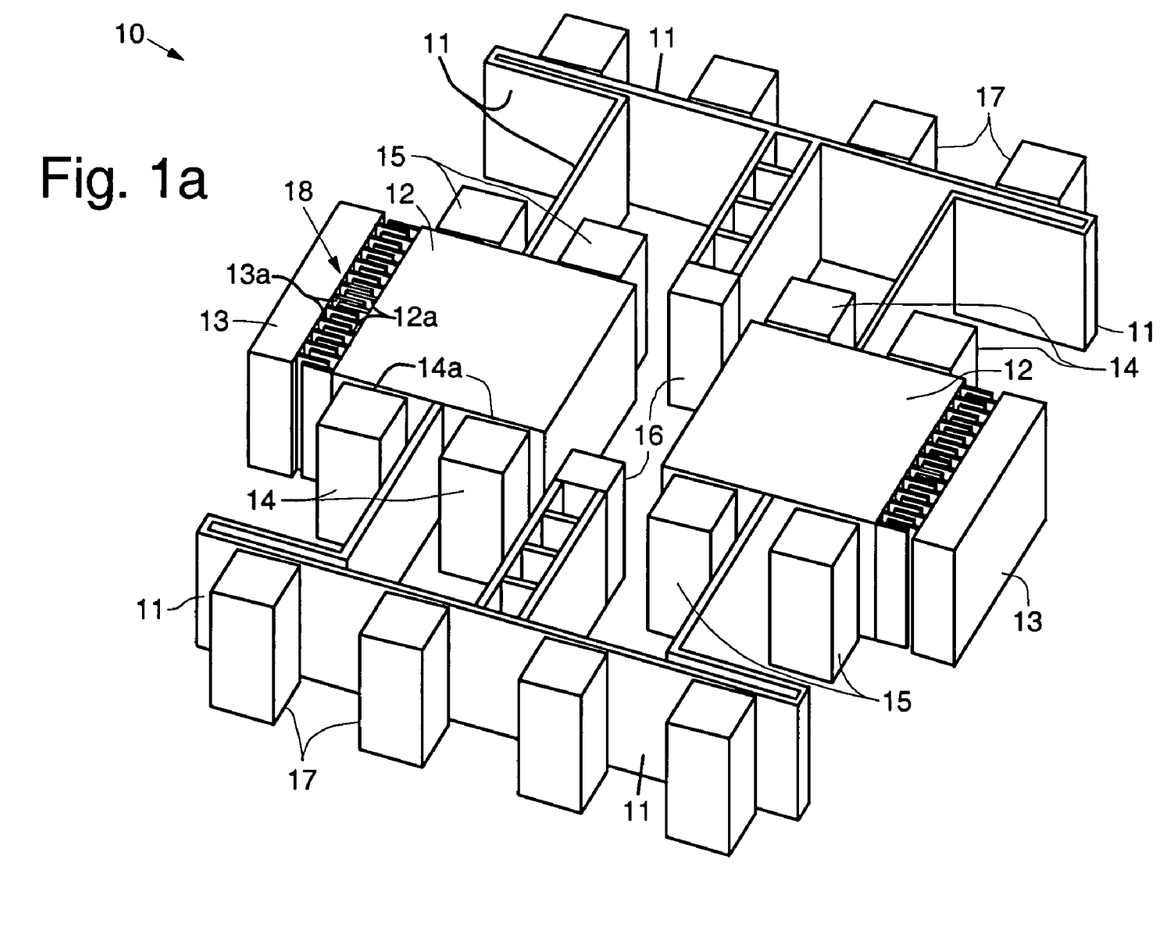
FIG. 1a illustrates an exemplary in-plane solid-mass single-crystal silicon tuning fork gyroscope in accordance with the principles of the present invention.

Referring to the drawing figures, FIG. 1a illustrates components of an exemplary in-plane solid-mass single-crystal silicon tuning fork gyroscope 10 in accordance with the principles of the present invention. FIG. 1 shows only a top or device layer 23 (FIGS. 3a–3d) With reference to FIGS. 3a–3d, the gyroscope 10 comprises a lower or handle layer 21 or substrate 21 and the top or device layer 23, with an insulating layer 22 disposed there between. During fabrication, portions of the lower and upper layers 21, 23 and insulating layer 22 are removed using microelectronic fabrication processes to form the gyroscope 10.

It is to be understood, that while the exemplary gyroscope 10 described herein was fabricated using silicon, other semiconductor materials, such as quartz or polycrystalline silicon, for example, or an electrically-conductive substrate, for example, may readily be employed. Thus, it is to be understood that the present invention is not limited to silicon structures. Also, although the insulating layer is preferably oxide, it is to be understood, that other insulating material, such as nitride, for example, may also be used, depending upon the application.

The exemplary gyroscope 10 is fabricated as a single-crystal structure using microelectronic processing techniques. The components making up the gyroscope 10 are fabricated by depositing, patterning and etching layers of semiconductor material and insulating layers to create the desired interconnected and/or coupled components.

The exemplary gyroscope 10 comprises a flexible support structure 11 (also referred to as flexures 11 or beams 11) which is semiconductor material used to support components of the gyroscope 10. First and second opposed proof masses 12 are supported by the support structure 11. Distal ends of the proof masses 12 have a plurality of fingers 12a (or projections 12a) extending outwardly there from. First and second drive electrodes 13, each having a plurality of fingers 13a (or projections 13a) extending inwardly therefrom.

The respective fingers 12a of the proof masses 12 and the fingers 13a of the drive electrodes 13 lie adjacent to one another and have air gaps between them. The pluralities of fingers 12a, 13a are interdigitated and form comb drives 18. As will be discussed later, the proof masses 12 are suspended in air, and the first and second drive electrodes 13 are supported by the insulating layer 22 and lower or handle layer 21.

Two tuning electrodes 14 are disposed supported by the support structure 11 on a first lateral side of the first proof mass 12, and two sense electrodes 15 are supported by the support structure 11 on a second lateral side of the first proof mass 12. Similarly, two tuning electrodes 14 are supported by the support structure 11 on the second lateral side of the second proof mass 12, and two sense electrodes 15 are supported by the support structure 11 on the first lateral side of second first proof mass 12.

First and second anchors 16 are supported by the insulating layer 22 and handle layer 21 and are disposed adjacent to proximal surfaces of the proof masses 12. The anchors 16 provide support for the tuning fork structure. The proof masses 12 and flexures 11 (i.e., beams 11 that connect proof-masses 12 to the anchors 16) are held by the substrate at these points only. Optional sets of quadrature cancellation (balancing) electrodes 17 may be disposed along lateral edges of the support structure 11.

The operating principle of the present in-plane tuning fork gyroscope 10 is based upon a conventional mechanical tuning fork's response to rotation. In such a design, proof-masses are driven to resonance along an x-axis of the gyroscope 10, and Coriolis acceleration induced by rotation around the z-axis is sensed along the y-axis of the gyroscope 10.

A major incentive in utilizing this symmetric tuning fork architecture, as opposed to a conventional frame-design or single-mass-design is the differential sensing capability. As a result, linear acceleration/shock signals are rejected as "common mode" without the need for complex electronics. The spring structure design (provided by the flexible support structure 11) makes it possible to drive the solid proof masses 12 linearly with displacement amplitudes in the range of 4–6 µm. A high Q in the drive mode is necessary to produce large drive amplitudes using small drive voltages, which is a highly desirable feature required in low-power CMOS interfacing. A high Q in a sense mode is imperative to substantially increase sensitivity of the gyroscope 10 and lower the Brownian noise floor of the gyroscope 10.

Figure 1B:
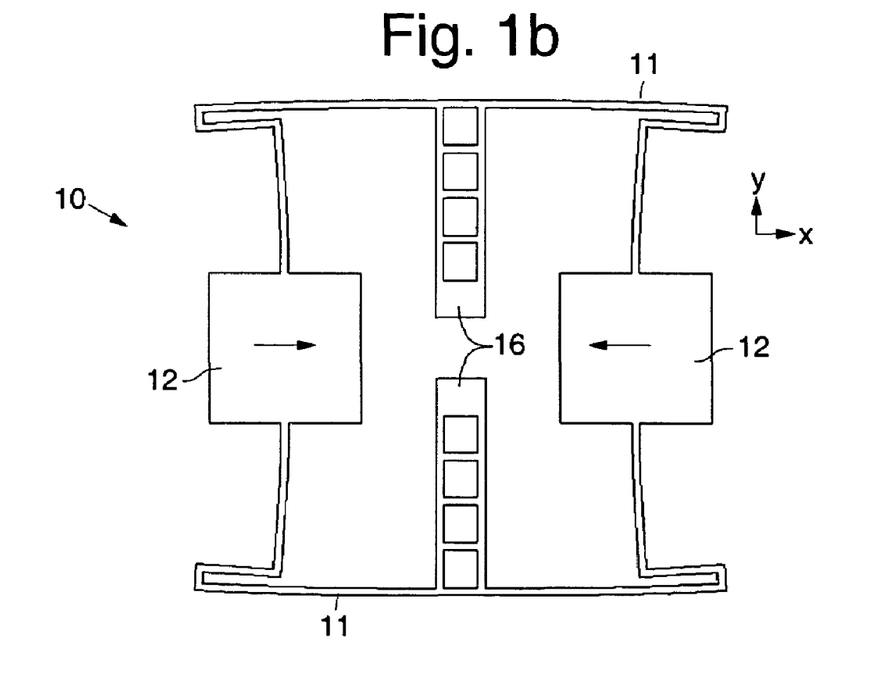
FIGS. 1b and 1c illustrate resonant mode shapes (exaggerated for clarity)
Figure 1C:
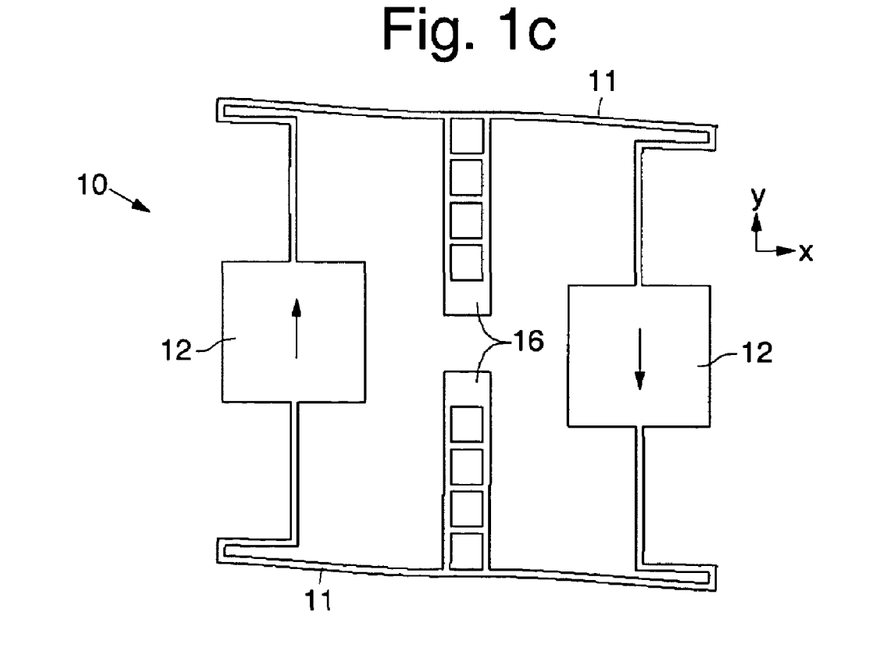

The primary energy loss mechanism that leads to Q degradation is support loss. This is discussed by Z. Hao, et al., in "An Analytical Model for Support Loss in Micromachined Beam Resonators with In-plane Flexural Vibrations," *Sensors and Actuators A*, Vol. 109, December 2003, pp. 156–164. The anchor 16 and the support flexures 11 are designed to ensure minimal support loss and consequently high Q in the drive and sense modes by torque cancellation/reduction. Detailed ANSYS simulations of the flexures were performed to optimize structural dimensions and to allow the sense mode to occur 50–100 Hz higher than the drive mode. Once the gyroscope 10 is fabricated, the sense mode is tuned electrostatically using the tuning electrodes 14 to match the drive mode frequency. FIGS. 1b and 1c show resonant mode shapes as simulated in an ANSYS computer simulation (exaggerated for clarity). The arrows within the proof masses 12 indicate direction of motion.

Figure 2A:
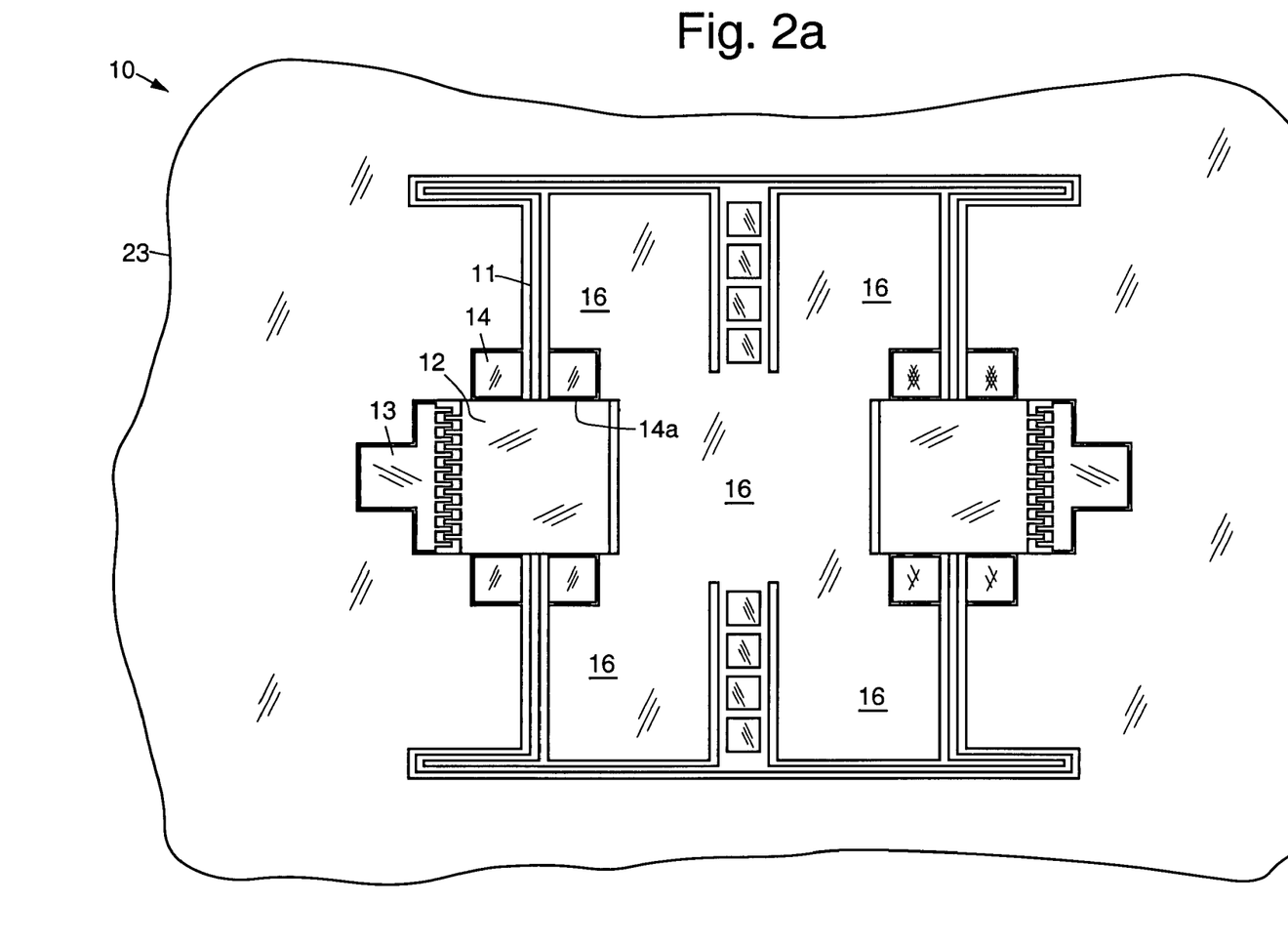
FIG. 2a illustrates a close-up view of an exemplary prototype in-plane solid-mass silicon tuning fork gyroscope.
Figure 2B:
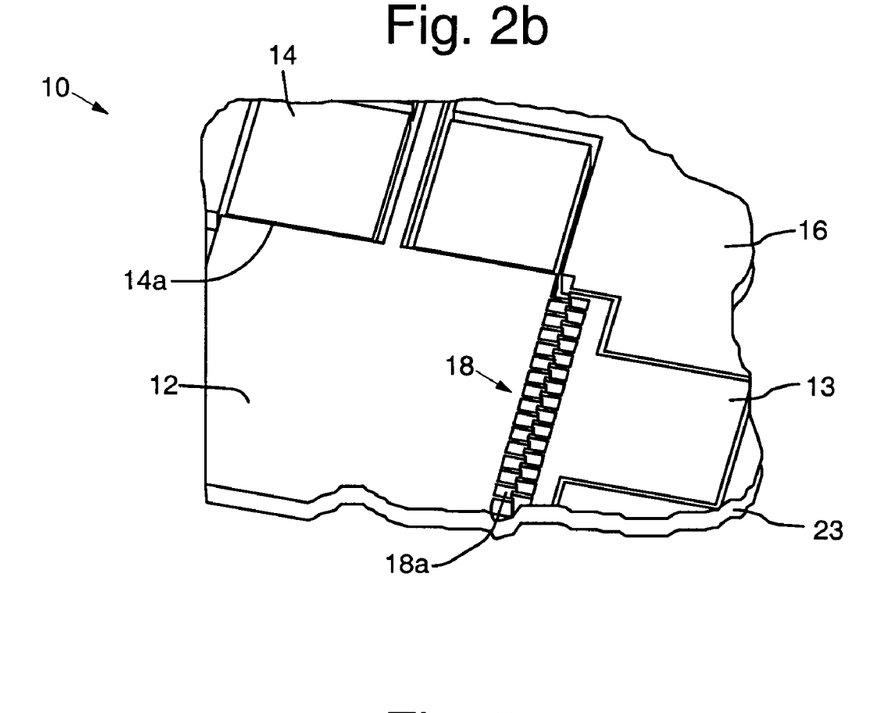
Figure 2C:
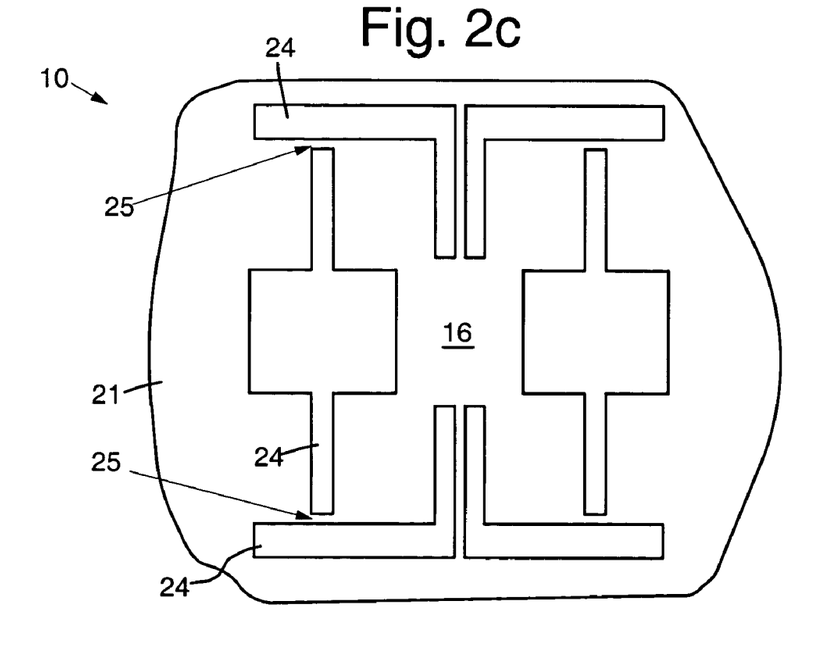
Figure 3A:
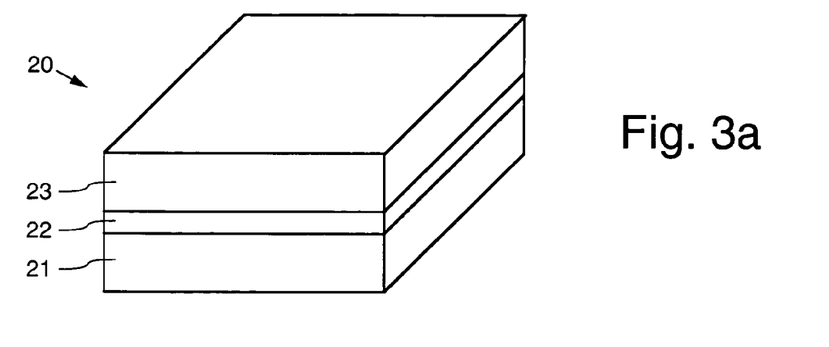
FIGS. 3a–3d illustrates a process flow used to fabricate the gyroscope.
Figure 3B:
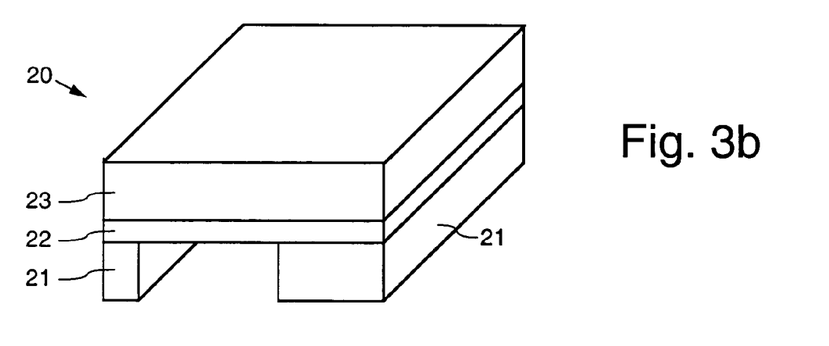
Figure 3C:
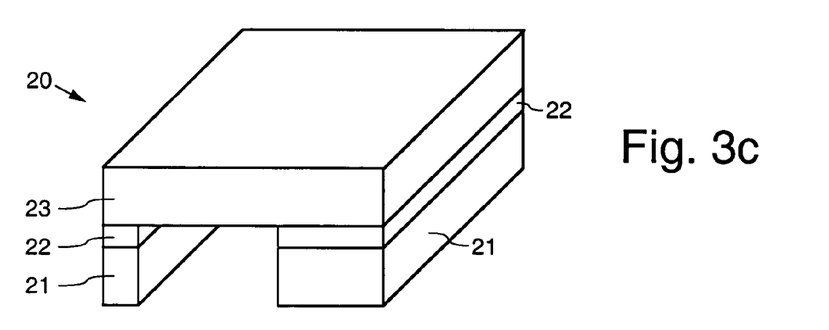
Figure 3D:
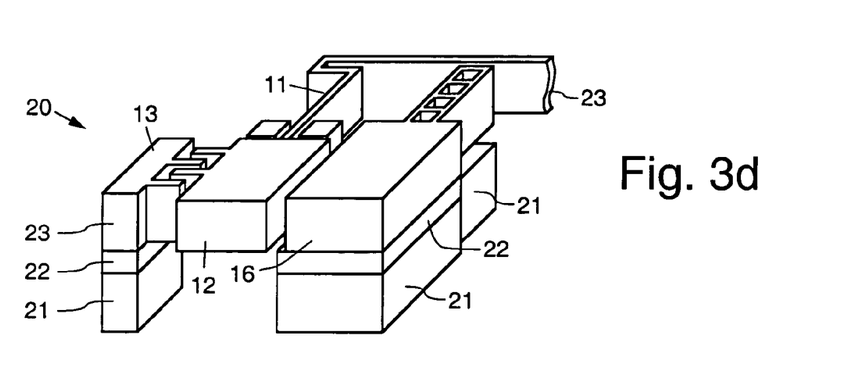

Prototype structures comprising the gyroscope 10 were fabricated on 40 µm silicon-on-insulator (SOI) wafers. Illustrations representative of scanning electron microscope (SEM) pictures of a fabricated gyroscope 10 are shown in FIGS. 2a–2c. FIG. 2a illustrate a close-up view of an exemplary in-plane solid-mass silicon tuning fork gyroscope 10. FIG. 2b illustrates 6 µm comb gaps 18a and 2.5 µm sense gaps 14a of the gyroscope 10. FIG. 2c illustrates support posts 25 for the anchors 16 as seen from the back (under) side of the gyroscope 10 (i.e., looking at the bottom of the handle or lower layer 21). The support posts 25 connect the center portion of the lower substrate 21 to outer portions thereof. The support posts 25 are horizontal extensions of the substrate 21 which are separated from the beams 11 by an air gap and whose thickness is on the order of the thickness of the insulating layer 22.

FIGS. 3a–3d illustrates a process flow used to fabricate the gyroscope 10 shown in FIG. 1a. Only a portion of the gyroscope 10 is illustrated in FIGS. 3a–3d. Moving sections of the gyroscope 10 and areas under the comb drives 18 are first released from the backside of the wafer by etching a handle silicon layer 21 through to a buried oxide layer 22 (insulating layer 22) using a well-known Bosch process. The buried oxide layer 22 is then removed in a reactive ion etching (RIE) system and finally a top layer 23 is patterned all the way through, leaving behind a suspended structure whose anchors 16 are supported by the handle layer or substrate 21 via several support posts 25 of the flexible support structure 11. The final etch step involves a short hydrofluoric acid (HF) etch to release areas under the support posts 25.

The fabrication process is very simple and precludes the requirement of any perforations in the proof mass 12, resulting in a larger mass per unit area. The simultaneous elimination of a ground plane under the comb drives 18 prevents excitation of the out of plane modes and detrimental effects of levitation.

Figure 4A:
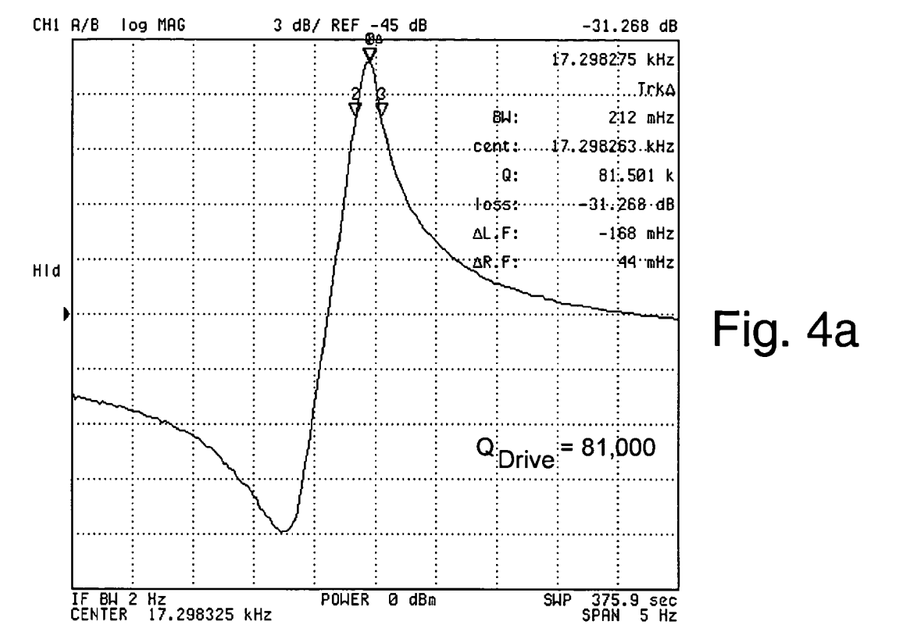
Figure 4B:
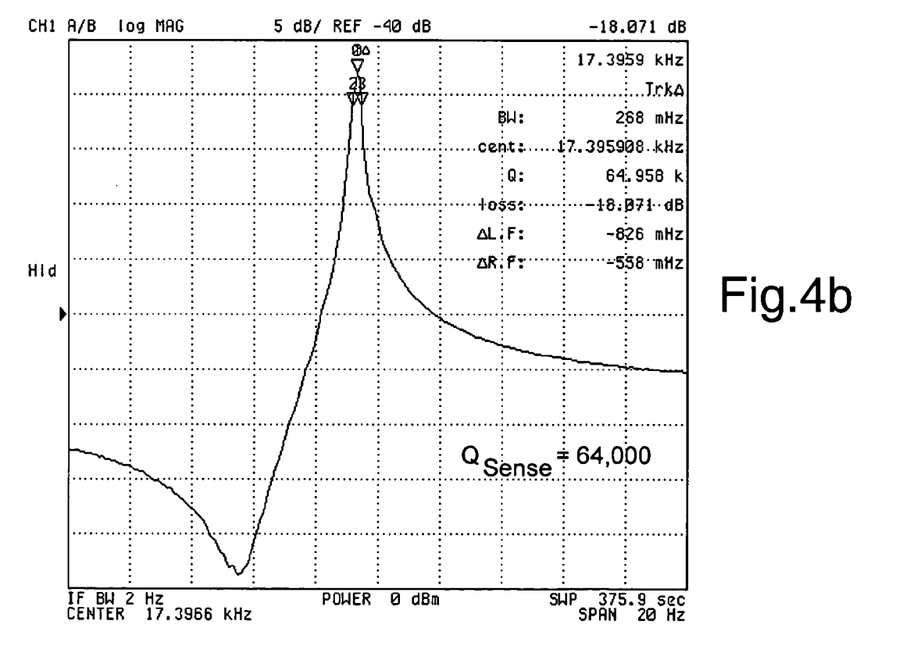

A prototype gyroscope 10 was tested in vacuum and high Q operation was confirmed. FIGS. 4a and 4b show measured drive and sense resonant modes, respectively, for the prototype gyroscope 10 with high Q values (~81,000 for drive and ~64,000 for sense). As discussed earlier, such high Q's are essential to achieve inertial grade performance in a small bandwidth. Larger bandwidth may be obtained by operating the gyroscope 10 in a closed loop at the expense of sensitivity.

Figure 5:
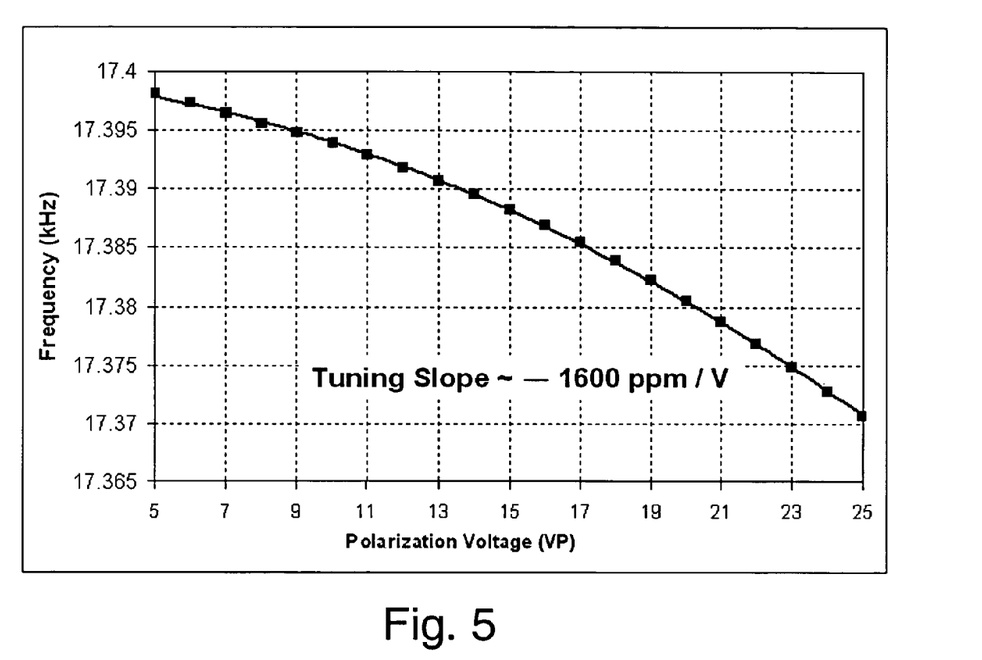
FIG. 5 shows the tuning characteristics of the sense resonant mode for the prototype gyroscope shown in FIGS. 4a and 4b.

FIG. 5 shows the tuning characteristics of the sense resonant mode. This mode shows a variation of approximately −1600 ppm/V over a tuning voltage range of 20 V. The tuning characteristics are crucial to obtain matched operation, which in turn is necessary to lower the Brownian noise floor.

Figure 6:
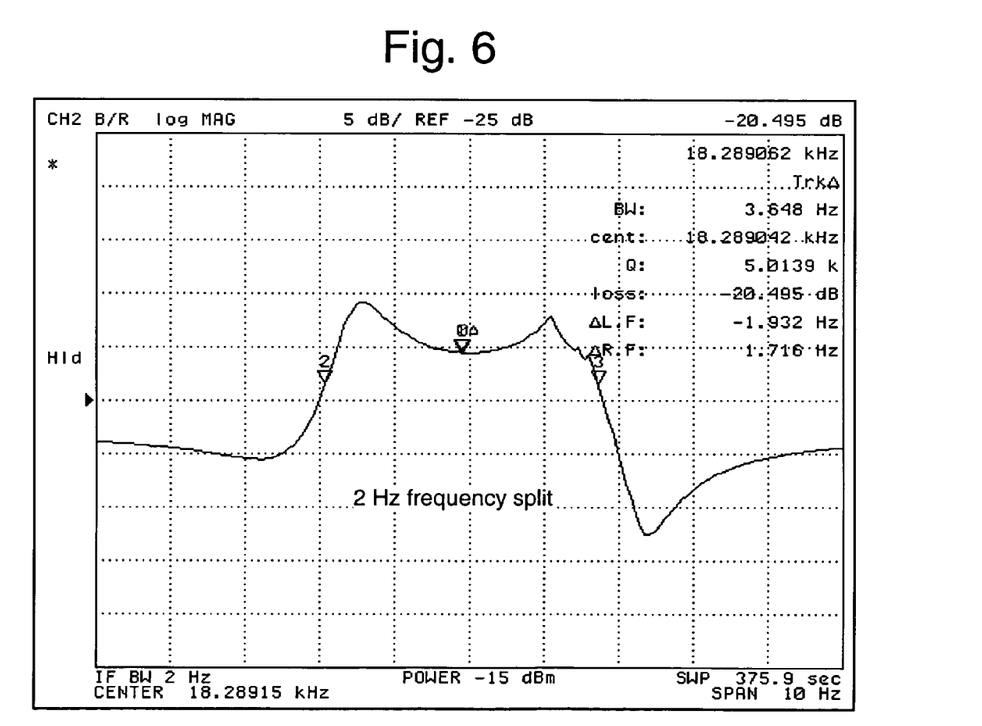
FIG. 6 shows that the resonant modes for another prototype gyroscope have been matched to within 2 Hz.

FIG. 6a shows tuning characteristics of the sense mode frequency of a second prototype device, and FIG. 6b shows that the resonant modes have been matched to within 2 Hz. From an initial separation of about 65 Hz, the drive and sense frequencies were matched to within 0.01% (2 Hz over 18.5 kHz) of each other.

Figure 7:
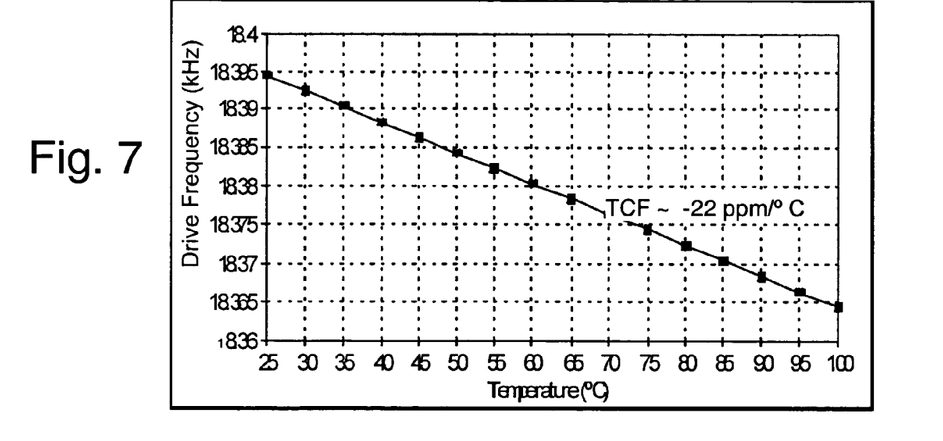
FIG. 7 shows the measured temperature variation of the drive resonant frequency for the prototype tuning-fork gyroscope shown in FIG. 6.

FIG. 7 shows the measured temperature variation of the drive resonant frequency for a second embodiment of the tuning fork gyroscope 10 with slightly different flexural widths. The drive mode temperature coefficient of frequency (TCF) was measured to be about −22 ppm/° C. The sense resonant mode also shows a similar TCF implying that mode matching can be maintained over temperature. Also, a single temperature compensation circuit will suffice to maintain mode matching over temperature.

Despite a mechanically decoupled design, in practice, fabrication imperfections can lead to non-zero off-diagonal elements in the spring stiffness and damping coefficient matrices (see Clark. W. A., "Micromachined Vibratory Rate Gyroscopes," *Ph.D. Dissertation*, University of California, Berkeley (1997)) resulting in significant zero-rate output. This quadrature error prevents close matching of the drive and sense resonant modes (see, for example, Schwarzelbach, O., et al., "New Approach for Resonant Frequency Matching of Tuning Fork Gyroscopes by Using a Non-Linear Drive Concept," *Proceedings Transducers* 2001, pp. 464–467).

Inertial grade performance requires that the high Q resonant modes be matched. This lowers the Brownian noise floor by a factor of $\sqrt{Q_{sense}}$ (see Ayazi, F., "A High Aspect-Ratio High-Performance Polysilicon Vibrating Ring Gyroscope," *Ph.D. Dissertation*, University of Michigan, Ann Arbor (2001)). The Brownian noise floor is an order of magnitude greater than the electronic noise floor and is therefore a key factor in determining the resolution of the gyroscope 10. Additionally, any mismatch is undesirable because it reduces the sensitivity and makes it a function of the frequency of input rotation signal.

Figure 8:
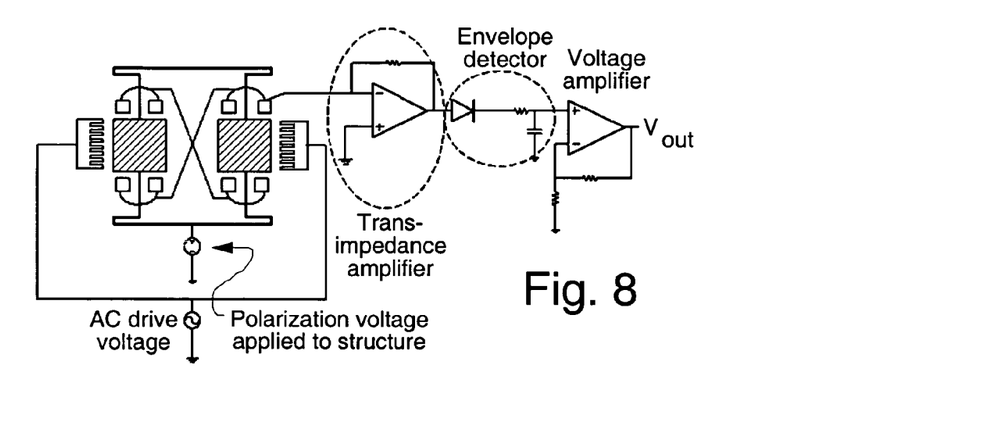
FIG. 8 shows a schematic of the basic setup used to test the gyroscope.

FIG. 8 shows a schematic diagram showing the setup used to test the gyroscope 10. There are two resonant modes that occur along the x-axis. The first resonant mode involves the proof-masses 12 vibrating along the same direction (pseudo-drive mode). The second resonant mode, which was defined earlier as drive, involves the proof-masses 12 vibrating along opposite directions. These two modes correspond to the symmetric and anti-symmetric modes of a tuning fork. This pseudo-drive mode has been designed to occur 300 Hz below the actual drive mode. Filtering this mode out electronically places stringent specifications on filter characteristics and is not amenable to CMOS integration. However, this mode can be effectively suppressed by applying a sinusoidal drive signal to both the comb-drives simultaneously.

The sense electrodes are cross-coupled to obtain a greater change in sense capacitance, and therefore a greater signal output. Tuning voltages are applied separately though an external DC power supply to electrostatically balance the drive and sense resonant modes. The Coriolis response is sensed using a trans-impedance amplifier and demodulated using a simple envelope detector circuit before being passed to a final gain stage.

Figure 9:
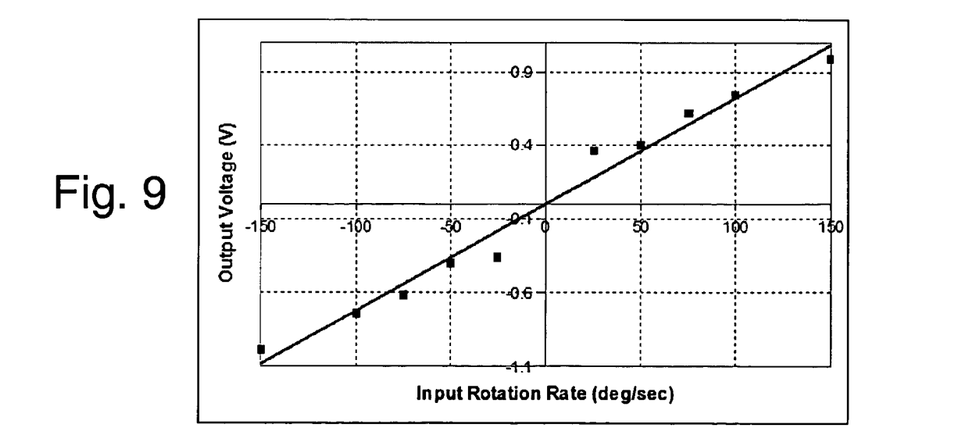
FIG. 9 shows the measured rate results from the prototype tuning fork gyroscope shown in FIG. 6.

Measured rate results from the tuning fork gyroscope 10 with a 2 Hz resonant mode mismatch and 3 µm drive amplitude yields an open-loop rate sensitivity of 7.2 mV/°/s, as shown in FIG. 9b. Table I summarizes key parameters of the gyroscope 10.

TABLE I

Summary of the solid-mass silicon tuning fork gyroscope parameters.

| | |
|---|---|
| Single proof mass dimension (in µm) | 400 × 400 × 40 |
| Effective mass | 30 µg |
| Operating Frequency | 18.5 kHz |
| Split of drive and sense resonant frequencies | 2 Hz |
| Rate sensitivity | 7.2 mV/°/s |
| Resolution with 2 Hz freq mismatch | 1.3°/h/$\sqrt{Hz}$ |
| Theoretical Brownian noise floor with matched modes | 0.3°/h/$\sqrt{Hz}$ |
| Electronic noise floor (input ref. noise = 1 µV/$\sqrt{Hz}$) | 0.02°/h/$\sqrt{Hz}$ |
| Measured temp. coefficient of freq. (TCF) | −22 ppm/° C. |

A prototype in-plane, solid-mass silicon tuning fork gyroscope 10 was implemented on 40 µm SOI. This design demonstrates high drive and sense mode quality factors, large drive amplitudes and increased mass, which are critical requirements to lower the Brownian noise floor and thereby achieve sub-degree per hour angular rate resolutions. Strategic electrode placement schemes and electronic feedback control mechanisms may be employed to achieve complete matching of the high-Q resonant modes and mitigate the quadrature error. The high Q operation calls for advancements in vacuum packaging technologies such as those mentioned by Najafi, K., in "Micropackaging Technologies for Integrated Microsystems: Applications to MEMS and MOEMS," *Proc. SPIE Micromachining & Microfabrication Symp.* 2003, pp. 1–19, for example.

Features of the present gyroscope 10 and its operation are as follows:

1) The in-plane operation scheme is novel to other tuning fork based MEMS gyroscopes that have primarily relied on out-of-plane motion to sense rotation.

2) Another feature of the gyroscope 10 is the design of support flexures 11 and anchors 16, which enable various important features of the gyroscope 10.

(i) The frequency of the sense and drive resonant modes occur in close proximity of one another. It is critical for overall sensitivity/resolution of the gyroscope 10 to have maximum energy transfer between the two resonant modes in the event of a rotation signal. The gyroscope 10 incorporates tuning electrodes 14 which enables matching the drive and sense mode to achieve maximum response to rotation.

(ii) There is effective decoupling between the sense and drive resonant modes.

(iii) The gyroscope 10 achieves a extremely high quality factors (O) in both the drive and sense resonant modes. A high Q (81,000 in vacuum) for drive resonance provides for lower actuation voltages, and a high Q (65,000 in vacuum) in the sense resonance provides for extremely high overall resolution (sub-deg/hr).

3) The unique and symmetric distribution of the electrodes 13, 14, 15, 17 provide for the following capabilities.

(i) The tuning electrodes 14 enable matching of the drive and sense resonant modes to achieve a maximum response to rotation.

(ii) The balancing electrodes 17 may be employed for cancellation of cross-coupling between the two resonant modes (caused by fabrication imperfections) by application of appropriate balancing voltages.

4) The fabrication process flow allows for:

(i) Release of the proof-masses without perforations thereby ensuring maximum mass per unit area.

(ii) Elimination of a ground plane under the comb-drive electrodes 13, thereby suppressing adverse effects such as comb-levitation, etc.

Thus, an improved in-plane fork gyroscope, and methods of manufacture and operation have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

The invention claimed is:

1. A gyroscope comprising:
an electrically-conductive substrate comprising a lower support layer and an upper flexible support layer;
first and second separated proof masses lying in and supported by the upper flexible support layer that are separated from the lower support layer;
first and second drive electrodes disposed adjacent to the proof masses that are insulatably supported by the lower support layer and that are separated from the upper flexible support layer;
sense electrodes disposed adjacent to the proof masses that are insulatably supported by the lower support layer and that are separated from the upper flexible support layer; and
tuning electrodes disposed adjacent to the proof masses that are insulatably supported by the lower support layer and that are separated from the upper flexible support layer.

2. The gyroscope recited in claim 1 wherein the first and second drive electrodes are disposed adjacent distal ends of the proof masses.

3. The gyroscope recited in claim 1 wherein the sense electrodes and tuning electrodes are selectively disposed on lateral sides of the proof masses.

4. The gyroscope recited in claim 1 further comprising:
balancing electrodes insulatably supported by the lower support layer and laterally separated from the proof masses.

5. The gyroscope recited in claim 4 wherein the balancing electrodes are disposed adjacent lateral sides of the upper flexible support layer.

6. The gyroscope recited in claim 1 wherein adjacent ends of the respective proof masses and drive electrodes comprise pluralities of interdigitated projections that form comb drives.

7. The gyroscope recited in claim 1 wherein the lower support layer comprises one or more anchors that couple the upper flexible support layer to the lower support layer.

8. The gyroscope recited in claim 1 wherein drive and sense modes are operated at resonance.

9. A gyroscope comprising:
an electrically-conductive substrate comprising a lower support layer and an upper flexible support layer;
first and second separated proof masses lying in and supported by the upper flexible support layer that are separated from the lower support layer;
first and second drive electrodes disposed adjacent to the proof masses that are insulatably supported by the lower support layer and that are separated from the upper flexible support layer;
sense electrodes disposed adjacent to the proof masses that are insulatably supported by the lower support layer and that are separated from the upper flexible support layer; and
tuning electrodes disposed adjacent to the proof masses that are insulatably supported by the lower support layer and that are separated from the upper flexible support layer;
wherein drive and sense operational modes occur in a plane defined by the upper layer, and wherein resonant frequencies of in-plane operational modes of the gyroscope are in close proximity to one another to provide for matched mode operation.

10. A method of forming a gyroscope, comprising:
providing an electrically-conductive substrate comprising lower and upper layers having a sacrificial insulating layer disposed therebetween; and
patterning and etching the substrate to define first and second separated proof masses formed in the upper layer that are suspended above the lower layer, first and second drive electrodes formed in the upper layer and disposed adjacent to the proof masses that are supported by the insulating layer and the lower layer and that have portions thereof adjacent to the proof masses that are suspended above the lower layer, sense electrodes formed in the upper layer disposed adjacent to the proof masses that are supported by the insulating layer and the lower layer, and tuning electrodes formed in the upper layer disposed adjacent to the proof masses that are supported by the insulating layer and the lower layer.

11. The method recited in claim 10 wherein the patterning and etching comprises:
patterning and etching the lower layer in areas of the upper layer that correspond to the proof masses and the drive electrodes;
etching the sacrificial insulating layer exposed by patterning and etching the lower layer to remove the sacrificial insulating layer and expose the upper layer; and
patterning and etching the upper layer to define the first and second suspended separated proof masses, the first and second drive electrodes having suspended portions adjacent to the proof masses, the sense electrodes, and the tuning electrodes.

12. The method recited in claim 10 wherein drive and sense operational modes occur in a plane defined by the upper layer.

* * * * *